United States Patent Office 3,354,848
Patented Nov. 28, 1967

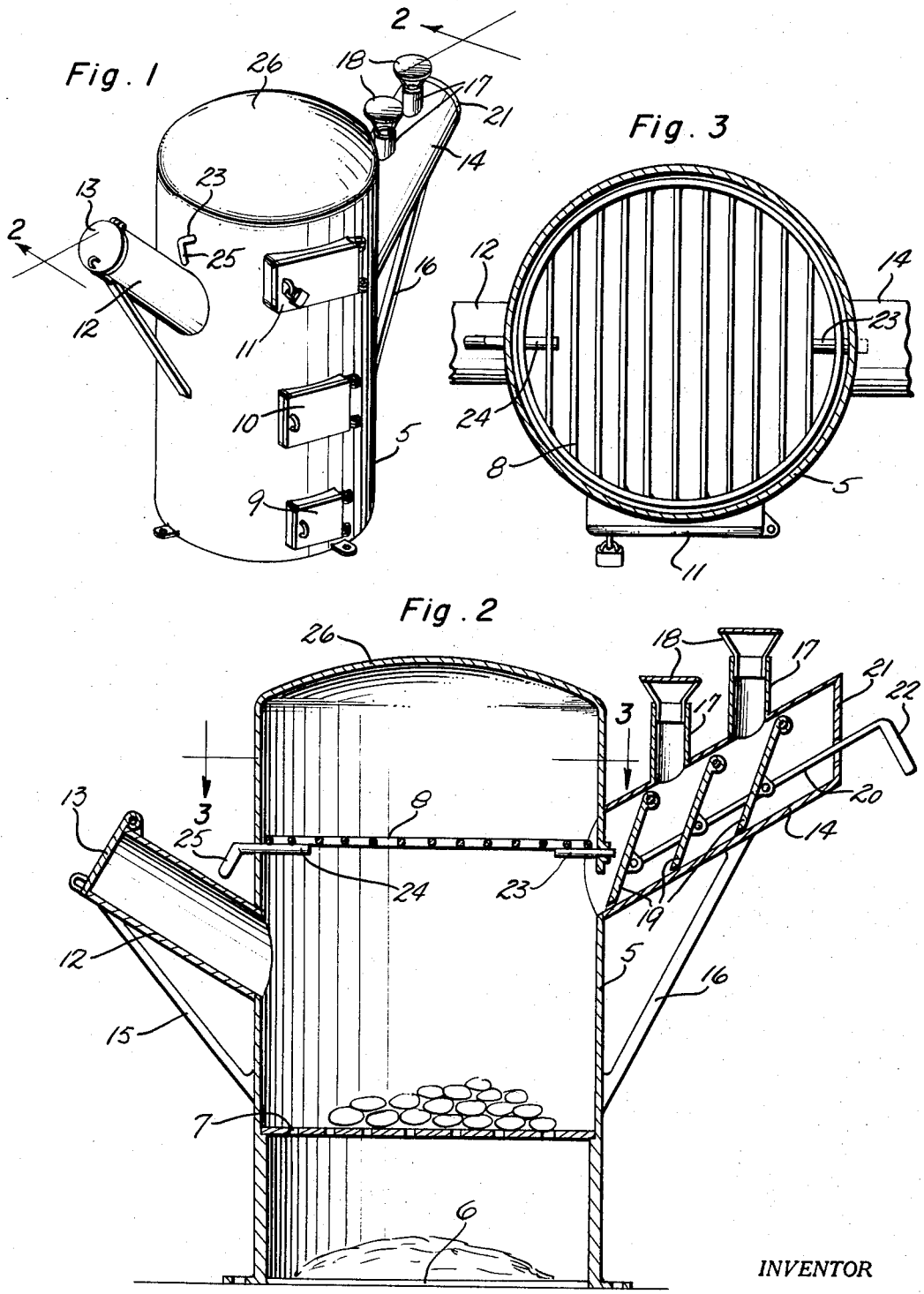

3,354,848
COMBINED TRASH BURNER AND BARBECUE PIT
Charles C. Tolston, 3400 Bell Crossing Drive,
Kansas City, Kans. 66104
Filed June 17, 1965, Ser. No. 464,670
5 Claims. (Cl. 110—18)

ABSTRACT OF THE DISCLOSURE

This invention comprises a combined trash burner and barbecue pit having a cylindrical steel container with a flat bottom and a convex top to drain off moisture. Within the container is a fire grate 7 and a barbecue grate 8. An inclined trash loading chute 12 leads into the container at a point above the fire grate. There are three doors, one at the barbecue grate, one above the fire grate and an ash door below the fire grate. These doors are an important part of the invention since they enable one to tend to the barbecue and its fire and also to remove incombustible trash, while the trash loading chute enables one to burn quantities of trash even in windy weather. An important part of the invention is the smokestack 14 having vertical hooded stacks 17 and a plurality of adjustable smoke breakers. With this arrangement there is adequate draft without the possibility that a spark or scrap of burning material will pass out of the smokestack.

This invention relates to both trash burners and barbecue pits, and more particularly, to a device that is the combination of both devices.

Nearly everyone who has a backyard having some form of barbecue pit or its equivalent, is at some time or other faced with the problem of burning trash with a minimum of trouble. It is generally soon learned that the burning of trash in an open barbecue pit is far from satisfactory. Even a slight breeze will tend to blow the trash out of the pit and over the lawn or the like.

It is, therefore, the principal object of this invention to provide a combined trash burner and barbecue pit in the form of a cylindrical fire container having a side opening for the placement of trash in the device and a separate opening for the placement of whatever is to be barbecued, the two operations not taking place at the same time.

Another object of this invention is to provide a combined trash burner and barbecue pit that has manually controlled smoke outlets.

Another object of this invention is to provide a combined trash burner and barbecue pit that can be successfully used with perfect safety on even the most windy day.

Another object of this invention is to provide a combined trash burner and barbecue pit in the form of a cylindrical object that presents a pleasing sight when placed in ones back yard or the like.

Still another object of this invention is to provide a combined trash burner and barbecue pit that can be used with perfect safety around small children or pets since the fire is totally enclosed within the device at all times.

These and other objects and advantages of my invention will more fully appear from the following description made in connection with the accompanying drawing wherein like reference characters refer to the same parts throughout the several views and in which:

FIGURE 1 is a perspective view of this invention.

FIGURE 2 is a sectional view of this invention, taken substantially along line 2—2 of FIGURE 1, and viewed in the direction indicated by the arrows.

FIGURE 3 is a sectional view of this invention, taken substantially along line 3—3 of FIGURE 2, and viewed in the direction indicated by the arrows.

Referring to the drawing, reference numeral 5 indicates a vertically disposed cylindrical steel container having a bottom 6 above which is located the horizontally disposed fire grate 7, and still further above is located the barbecue grate 8 that is also horizontally disposed and parallel to the aforesaid fire grate 7. An ash door 9 is in the lower side of the aforesaid steel container between the bottom 6 and the underside of the fire grate 7, while a fire door 10 is located just above the fire grate 7 and the barbecue door 11 is located at the aforesaid barbecue grate 8 of this invention.

An angularly disposed cylindrical trash loading chute 12 projects outward from the side of the aforesaid cylindrical steel container 5 from a location just under the aforesaid barbecue grate 8 of this invention. A hinged door 13 is mounted on the outer end of the aforesaid trash loading chute 12, as one can see by looking at FIGURES 1 and 3 of the drawing. Here it is seen that this invention is also provided with an angularly disposed smokestack 14 that projects outward and upward from the other side of the aforesaid cylindrical steel container 5. The trash loading chute 12 is supported by the brace member 15 while the aforesaid smokestack 14 is supported by the brace member 16.

Continuing to look at FIGURE 3 of the drawing, it will be seen that the aforesaid smokestack 14 is not only provided with a pair of vertically disposed and spaced smoke outlet stacks 17 on the top of each stack is located the hood 18, but also is provided with a trio of spaced hinged smoke breakers 19 that are in effect dampers through the center of which passes the manually operated control lever 20 that has its upper and outer end extending through the end plate 21 of the smoke stack 14. The upper and outer end of the just mentioned control lever 20 is turned downward to form the hand lever 22, which is shown only in the aforesaid FIGURE 3 of the drawing.

The previously mentioned barbecue grate 8 is supported on one side by the support rod 23 that extends horizontally inward from the side of the cylindrical steel container 5, while the other side of the same grate is supported by the shifting rod 24 that extends horizontally through the opposite side of the container 5 only to terminate in the downwardly turned handle 25, which is used to reverse the grate when it is not in actual use.

The only other part of this invention that so far has not been mentioned is the convex top 26 that is integral with the sides of the often mentioned cylindrical steel container 5 of this invention.

The way in which this invention of a combined trash burner and barbecue pit is used is so obvious from an examination of FIGURE 2 of the drawing that no explanation of the same need be given here.

It will, of course, be understood that various changes may be made in the form, details, arrangements and proportions of the parts without departing from the scope of my invention which consists of the matter shown and described herein and set forth in the appended claims.

What I claim is:

1. A combined trash burner and barbecue pit the character described, comprising a vertically disposed cylindrical metal container having both a fire grate and a barbecue grate therein; and a door opening onto the said fire grate, as well as a separate door that opens onto the said barbecue grate; and a trash loading chute projecting outward from the side of the said metal container as well as a smokestack that projects outward from the other side of the said metal container.

2. A combined trash burner and barbecue pit of the character described, comprising a vertically disposed cylindrical metal container having both a fire grate and a barbecue grate therein; and a door opening onto the said fire grate, as well as a separate door that opens onto said barbecue grate; and a third door that is located below the said fire grate in order that the ashes may be removed from the bottom of the said metal container; and a trash loading chute projecting outward from the side of the said metal container as well as a smokestack that projects outward from the other side of the said metal container.

3. A combined trash burner and barbecue pit of the character described, comprising a vertically disposed cylindrical steel container having an integrally formed convex top as well as having both a fire grate and a barbecue grate therein; and a door opening onto the said fire grate, as well as a separate door that opens onto the said barbecue grate; and a third door that is located below the said fire grate in order that the ashes may be removed from the bottom of the said steel container; and a trash loading chute projecting outward from the side of the said steel container as well as a smokestack that projects outward from the other side of the said steel container.

4. A combined trash burner and barbecue pit of the character described, comprising a vertically disposed cylindrical steel container having an integrally formed convex top as well as having both a fire grate and a barbecut grate therein; and a door opening onto the said fire grate, as well as a separate door that opens onto the said barbecue grate; and a third door that is located below the said fire grate in order that the ashes may be removed from the bottom of the said steel container; and an angularly disposed cylindrical trash loading chute, having a hinged door on the outer end thereof, the said chute projecting outward from the side of the said steel container as well as a smokestack that projects outward from the other side of the said steel container.

5. A combined trash burner and barbecue pit of the character described, comprising a vertically disposed cylindrical steel container having an integrally formed convex top as well as having both a fire grate and a barbecue grate therein; and a door opening onto the said fire grate, as well as a separate door that opens onto the said barbecue grate; and a third door that is located below the said fire grate in order that the ashes may be removed from the bottom of the said steeel container; and an angularly disposed cylindrical trash loading chute, having a hinged door on the outer end thereof, the said chute projecting outward from the side of the said steel container as well as a smokestack having both a pair of vertically disposed and spaced stacks and on the top of each stack is located a hood, also a trio of hinged and manually operated smoke breakers therein, and the said smokestack projecting outward from the other side of the said steel container.

References Cited
UNITED STATES PATENTS

| | | |
|---|---|---|
| 951,703 | 3/1910 | Sawer. |
| 1,610,667 | 12/1926 | Feigenbaum _____ 110—18 |
| 2,833,201 | 5/1958 | Simank. |
| 2,902,026 | 9/1959 | Hathorn _____ 126—25 |

JAMES W. WESTHAVER, *Primary Examiner.*

H. B. RAMEY, *Assistant Examiner.*